US011155708B2

(12) United States Patent
Akaishi et al.

(10) Patent No.: US 11,155,708 B2
(45) Date of Patent: *Oct. 26, 2021

(54) POLYESTER ELASTOMER RESIN COMPOSITION HAVING EXCELLENT GREASE RESISTANCE

(71) Applicant: TOYOBO CO., LTD., Osaka (JP)

(72) Inventors: Takuya Akaishi, Shiga (JP); Yuki Maeda, Shiga (JP); Ryouhei Yamane, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 640 days.

This patent is subject to a terminal disclaimer.

(21) Appl. No.: 16/076,025

(22) PCT Filed: Feb. 8, 2017

(86) PCT No.: PCT/JP2017/004502
§ 371 (c)(1),
(2) Date: Aug. 7, 2018

(87) PCT Pub. No.: WO2017/138548
PCT Pub. Date: Aug. 17, 2017

(65) Prior Publication Data
US 2021/0189115 A1   Jun. 24, 2021

(30) Foreign Application Priority Data
Feb. 9, 2016 (JP) .............................. JP2016-022527

(51) Int. Cl.
*C08L 67/02* (2006.01)
*C08L 77/02* (2006.01)

(52) U.S. Cl.
CPC .............. *C08L 67/02* (2013.01); *C08L 77/02* (2013.01); *C08L 2203/30* (2013.01); *C08L 2205/03* (2013.01); *C08L 2207/04* (2013.01)

(58) Field of Classification Search
CPC ...... C08L 67/02; C08L 77/02; C08L 2207/04; C08L 2205/03; C08L 2203/30
See application file for complete search history.

(56) References Cited

U.S. PATENT DOCUMENTS

| 5,733,986 A | 3/1998 | Senda et al. |
| 10,626,270 B2 * | 4/2020 | Maeda ................ C08L 63/00 |
| 2011/0230602 A1 | 9/2011 | Nagai et al. |

FOREIGN PATENT DOCUMENTS

| JP | 2-173059 | 7/1990 |
| JP | 11-323109 | 11/1999 |
| JP | 11-323110 | 11/1999 |
| JP | 2003-12900 | 1/2003 |
| JP | 2005-263 877 | 9/2005 |
| JP | 3714747 | 11/2005 |
| JP | 2010-84140 | 4/2010 |
| JP | 2010-265407 | 11/2010 |
| JP | 2012-92185 | 5/2012 |
| JP | 2012-107155 | 6/2012 |
| JP | 2012-211275 | 11/2012 |
| JP | 2015-168815 | 9/2015 |

OTHER PUBLICATIONS

International Search Report dated May 9, 2017 in International (PCT) Application No. PCT/JP2017/004502.
Notification of Reasons for Refusal dated Dec. 19, 2017 in Japanese Application No. 2017-510685, with machine translation.

* cited by examiner

*Primary Examiner* — Robert S Jones, Jr.
(74) *Attorney, Agent, or Firm* — Wenderoth, Lind & Ponack, L.L.P.

(57) ABSTRACT

The present invention relates to a polyester elastomer resin composition comprising: a thermoplastic polyester elastomer (A); a thickening agent (B); and a urea compound scavenger (C), wherein the thermoplastic polyester elastomer (A) is composed of a hard segment and a soft segment that are linked to each other; the hard segment being composed of a crystalline polyester formed from an aromatic dicarboxylic acid and an aliphatic and/or alicyclic diol, the soft segment being at least one member selected from aliphatic polyethers, aliphatic polyesters, or aliphatic polycarbonates; the urea compound scavenger (C) has an amine value of 50 eq/t or more; the thickening agent (B) is present in an amount of 0 to 5 parts by mass, and the urea compound scavenger (C) is present in an amount of 0.1 to 10 parts by mass, per 100 parts by mass of the thermoplastic polyester elastomer (A). The invention can decrease the deterioration of physical properties of a polyester elastomer caused by the elastomer coming into contact with grease in an environment at a temperature exceeding 140° C.

7 Claims, No Drawings

POLYESTER ELASTOMER RESIN COMPOSITION HAVING EXCELLENT GREASE RESISTANCE

TECHNICAL FIELD

The present invention relates to polyester elastomer resin compositions excellent in grease resistance.

BACKGROUND ART

Thermoplastic polyester elastomers exhibit excellent injection or extrusion moldability and high mechanical strength, and have applications in automobile parts, electric and electronic components, fibers, films, etc., as materials having excellent rubber properties (e.g., elastic recovery, impact resistance, and flexibility) and excellent cold resistance.

Thermoplastic polyester elastomers were considered unsuitable for blow molding due to their low melt viscosity. However, viscosity-increasing methods using a polyepoxy compound or a polyisocyanate compound have become available. Taking advantage of the features, thermoplastic polyester elastomers have also been used in blow-molded products, such as flexible boots, for dust protection or grease retention of flexible drive couplings, such as constant-velocity joints of automobiles (PTL 1).

Functional parts, such as flexible boots, are required to have properties such as flexing fatigue resistance, heat aging resistance, oil resistance, and grease resistance, and the requirements for the levels of such properties have been rising every year. To cope with this, for example, the following are proposed: a combination of antioxidants (PTL 2), a combination of antioxidants with an epoxy compound (PTL 3), and a combination of epoxy compounds with a carbodiimide compound (PTL 4). The method disclosed in PTL 4 requires the addition of a large amount of epoxy compounds, and PTL 4 discloses nothing about properties of blow molded products, such as oil resistance and grease resistance. The methods disclosed in PTL 2 and 3 appear to have improved heat aging resistance, oil resistance, grease resistance, etc.; however, the grease resistance, in particular, may not be satisfactory, for example, in terms of flexing fatigue, in a more severe environment at a temperature exceeding 140° C., and there is room to further improve the polyester elastomer.

CITATION LIST

Patent Literature

PTL 1: U.S. Pat. No. 3,714,747
PTL 2 JPH11-323109A
PTL 3: JPH11-323110A
PTL 4: JP2012-107155A

SUMMARY OF INVENTION

Technical Problem

An object of the present invention is to provide a polyester elastomer resin composition that is also excellent in grease resistance at high temperatures,

Solution to Problem

To achieve the object, the present inventors conducted extensive research and found that when a urea compound is contained in grease, the tensile elongation of thermoplastic polyester elastomers markedly decreases at a temperature exceeding 140° C. due to the action of the added urea compound, and proposed the following invention. Specifically, the present invention is as described below.

[1]
A polyester elastomer resin composition comprising:
a thermoplastic polyester elastomer (A);
a thickening agent (B); and
a urea compound scavenger (C), wherein
the thermoplastic polyester elastomer (A) is composed of a hard segment and a soft segment that are linked to each other,
the hard segment being composed of a polyester formed from an aromatic dicarboxylic acid and an aliphatic and/or alicyclic diol,
the soft segment being at least one member selected from aliphatic polyethers, aliphatic polyesters, or aliphatic polycarbonates,
the urea compound scavenger (C) has an amine value of 50 eq/t or more,
the thickening agent (B) is present in an amount of 0 to 5 parts by mass, and the urea compound scavenger (C) is present in an amount of 0.1 to 10 parts by mass, per 100 parts by mass of the thermoplastic polyester elastomer (A).

[2]
The polyester elastomer resin composition according to [1], wherein the urea compound scavenger (C) is an amino group containing compound having an amine value of 50 to 2000 eq/t.

[3]
The polyester elastomer resin composition according to [1] or [2], which has a reduced viscosity of 2.0 to 3.5 dl/g, and an acid value of 0 to 5 eq/t.

[4]
The polyester elastomer resin composition according to any one of [1] to [3], wherein the thickening agent (B) is a polyfunctional compound having at least one reactive group selected from epoxy groups, acid anhydride groups, carbodiimide groups, or isocyanate groups.

[5]
The polyester elastomer resin composition according to any one of [1] to [4], wherein the urea compound scavenger (C) is a polyamide.

[6]
The polyester elastomer resin composition according to any one of [1] to [5], wherein after the polyester elastomer resin composition is subjected to heat treatment at 140° C. for 300 hours with a urea compound-containing grease being applied to the composition, the polyester elastomer resin composition has a tensile elongation of 200% or more.

[7]
The polyester elastomer resin composition according to any one of [1] to [6], wherein the soft segment of the thermoplastic polyester elastomer resin (A) is an aliphatic polyether.

Advantageous Effects of Invention

The polyester elastomer resin composition of the present invention, due to its excellent grease resistance at high temperatures, can even be used in a severe environment at a temperature exceeding 140° C. in applications where high levels of flexing fatigue resistance, heat aging resistance, oil resistance, grease resistance, etc., are required.

DESCRIPTION OF EMBODIMENTS

Thermoplastic Polyester Elastomer (A)

The thermoplastic polyester elastomer for use in the present invention is composed of a hard segment and a soft segment. The hard segment is composed of a polyester. The aromatic dicarboxylic acid that partly forms the polyester of the hard segment may be a widely used typical aromatic dicarboxylic acid, and the aromatic dicarboxylic acid is not particularly limited. The major aromatic dicarboxylic acid is preferably terephthalic acid or naphthalene dicarboxylic acid (among isomers, 2,6-naphthalene dicarboxylic acid is preferable), and is preferably present in an amount of 70 mol % or more, and more preferably 80 mol % or more of the total dicarboxylic acids in the polyester of the hard segment. Other dicarboxylic acid components include aromatic dicarboxylic acids, such as diphenyldicarboxylic acid, isophthalic acid, and sodium 5-sulfoisophtalate; alicyclic dicarboxylic acids, such as cyclohexane dicarboxylic acid, and tetrahydrophthalic anhydride; and aliphatic dicarboxylic acids, such as succinic acid, glutaric acid, adipic acid, azelaic acid, sebacic acid, dodecanedioic acid, dimer acid, and hydrogenated dimer acid. These dicarboxylic acids can be used to such an extent that the dicarboxylic acids do not substantially decrease the melting point of the resin, and the amount is preferably 30 mol % or less, and more preferably 20 mol % or less, of the total acid components.

The aliphatic or alicyclic diol that partly forms the polyester of the hard segment in the thermoplastic polyester elastomer for use in the present invention may be a widely used typical aliphatic or alicyclic diol, and the aliphatic or alicyclic diol is not particularly limited. The major aliphatic or alicyclic diol is preferably $C_{2-8}$ alkylene glycols. Specifically, the aliphatic or alicyclic diol includes ethylene glycol, 1,3-propylene glycol, 1,4-butanediol, 1,6-hexanediol, and 1,4-cyclohexane dimethanol. Of these, either ethylene glycol or 1,4-butanediol is preferable from the standpoint of imparting heat resistance to the elastomer composition.

The component that constitutes the polyester of the hard segment is preferably one formed of a butylene terephthalate unit (a unit composed of terephthalic acid and 1,4-butanediol) or a butylene naphthalate unit (a unit composed of 2,6-naphthalene dicarboxylic acid and 1,4-butanediol) from the standpoint of physical properties, moldability, and cost performance.

When an aromatic polyester suitable for the polyester that constitutes the hard segment of the thermoplastic polyester elastomer (A) for use in the present invention is produced beforehand and copolymerized with the soft segment component, such an aromatic polyester can be easily prepared in accordance with a typical polyester production method. The polyester preferably has a number average molecular weight of 10000 to 40000.

The soft segment of the thermoplastic polyester elastomer (A) for use in the present invention is at least one member selected from aliphatic polyethers, aliphatic polyesters, or aliphatic polycarbonates. The aliphatic polyethers include polyethylene oxide) glycol, poly(propylene oxide) glycol, poly(tetramethylene oxide) glycol, poly(hexamethylene oxide) glycol, poly(trimethylene oxide) glycol, copolymers of ethylene oxide with propylene oxide, ethylene oxide adducts of poly(propylene oxide) glycol, and copolymers of ethylene oxide with tetrahydrofuran. Of these, poly(tetramethylene oxide) glycol and ethylene oxide adducts of poly (propylene oxide) glycol are preferable from the standpoint of elastic properties.

The aliphatic polyesters include poly(ε-caprolactone), polyenantholactone, polycaprylolactone, and polybutylene adipate. Of these, poly(ε-caprolactone) and polybutylene adipate are preferable from the standpoint of elastic properties.

The aliphatic polycarbonates are preferably those primarily formed of $C_{2-12}$ aliphatic dial residues. Examples of these aliphatic dials include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, and 2-methyl-1,8-octanediol. In particular, $C_{5-12}$ aliphatic dials are preferable from the standpoint of flexibility and low-temperature properties of the obtained thermoplastic polyester elastomer. These components may be used singly or in a combination of two or more where necessary, with reference to the descriptions below.

The aliphatic polycarbonate dials having excellent low-temperature properties that form the soft segment of the thermoplastic polyester elastomer of the present invention are preferably those having a low melting point (e.g., 70° C. or less) and a low glass-transition temperature. An aliphatic polycarbonate diol formed from 1,6-hexanediol, which is typically used for forming the soft segment of a thermoplastic polyester elastomer, has a glass-transition temperature of as low as about −60° C., and a melting point of about 50° C., thus exhibiting an excellent low-temperature properties. An aliphatic polycarbonate dial obtained by copolymerizing the aliphatic polycarbonate dial, for example, with a suitable amount of 3-methyl-1,5-pentanediol is also considered to have excellent low-temperature properties due to its decreased melting point or amorphous structure, although the glass-transition point is slightly increased compared with that of the original aliphatic polycarbonate dial. Additionally, an aliphatic polycarbonate diol composed of 1,9-nonanediol and 2-methyl-1,8-octanediol, for example, is considered to have excellent low-temperature properties because of its melting point of about 30° C. and a sufficiently low glass-transition temperature of about −70° C.

The soft segment of the thermoplastic polyester elastomer (A) is preferably an aliphatic polyether, from the problem-solving viewpoint of the present invention.

The thermoplastic polyester elastomer (A) for use in the present invention is preferably a copolymer mainly formed from terephthalic acid, 1,4-butanediol, and poly(tetramethylene oxide) glycol. In the dicarboxylic acid components that partly form the thermoplastic polyester elastomer (A), terephthalic acid is preferably present in an amount of 40 mol % or more, more preferably 70 mol % or more, still more preferably 80 mol % or more, and particularly preferably 90 mol % or more. In the glycol components that partly form the thermoplastic polyester elastomer (A), 1,4-butanediol and poly(tetramethylene oxide) glycol are preferably present in a total amount of 40 mol % or more, more preferably 70 mol % or more, still more preferably 80 mol % or more, and particularly preferably 90 mol % or more.

The poly(tetramethylene oxide) glycol preferably has a number average molecular weight of 500 to 4000. A number average molecular weight of less than 500 may make it unlikely to develop elastic properties. However, a number average molecular weight of more than 4000 may lead to decreased miscibility with the hard segment component, resulting in difficulty in forming a block copolymer. The poly(tetramethylene oxide) glycol more preferably has a number average molecular weight of 800 or more and 3000 or less, and still more preferably 1000 or more and 2500 or less.

Typically, the mass ratio of the hard segment to the soft segment (the hard segment:the soft segment) in the thermoplastic polyester elastomer for use in the present invention is preferably 30:70 to 95:5, more preferably 40:60 to 90:10, still more preferably 45:55 to 87:13, and most preferably 50:50 to 85:15.

The thermoplastic polyester elastomer (A) for use in the present invention is produced by a known method. For example, any of the following methods may be used: a method in which a diester formed from a dicarboxylic acid and a lower alcohol, an excessive amount of a low-molecular-weight glycol, and a soft segment component are subjected to transesterification in the presence of a catalyst, and the obtained reaction product is subjected to polycondensation; a method in which a dicarboxylic acid, an excessive amount of a glycol, and a soft segment component are subjected to esterification in the presence of a catalyst, and the obtained reaction product is subjected to polycondensation; a method in which a polyester for the hard segment is prepared beforehand, and a soft segment component is added to this polyester to prepare a randomized copolymer by transesterification; a method in which the hard segment and the soft segment are linked using a chain linking agent; and when poly(ε-caprolactone) is used for the soft segment, a method in which an addition reaction of a s-caprolactone monomer with the hard segment is performed.

Thickening Agent (B)

The thickening agent (B) of the present invention refers to a reactive compound having a functional group reactive with the hydroxyl group or carboxyl group of the thermoplastic polyester elastomer (A) (hereinafter, simply "reactive compound"). The reactive functional group is preferably at least one group selected from epoxy (glycidyl) groups, acid anhydride groups, carbodiimide groups, or isocyanate groups, and the reactive compound has 2 or more functional groups per molecule. The functional group is more preferably an epoxy group (glycidyl group) or a carbodiimide group.

When the thickening agent (B) is a polyfunctional epoxy compound having 2 or more epoxy groups, the compound specifically includes those having 2 epoxy groups, such as 1,6-dihydroxy naphthalene diglycidyl ether and 1,3-bis(oxiranylmethoxy) benzene; those having 3 epoxy groups, such as 1,3,5-tris(2,3-epoxypropyl)-1,3,5-triazine-2,4,6(1H,3H,5H)-trione and diglycerol triglycidyl ether; and those having 4 epoxy groups, such as a 1-chloro-2,3-epoxypropane/formaldehyde/2,7-naphthalene diol polycondensation product and pentaerythritol, polyglycidyl ether, Of these, a polyfunctional epoxy compound the skeleton of which has heat resistance is preferable. In particular, a difunctional or tetrafunctional epoxy compound having a naphthalene structure in the skeleton, or a trifunctional epoxy compound having a triazine structure in the skeleton is preferable. Difunctional or trifunctional epoxy compounds are preferable taking into consideration the degree of the increase in solution viscosity of the thermoplastic polyester elastomer (A), the effect in efficiently decreasing the acid value of the thermoplastic polyester elastomer (A), and the degree of gelatinization caused by the aggregation or solidification of the epoxy itself.

When the thickening agent (B) is a compound having a carbodiimide group, the compound for use may be a polycarbodiimide compound. Polycarbodiimide compounds are advantageous in efficiently decreasing the acid value.

The polycarbodiimide compound usable in the invention may be a polycarbodiimide having 2 or more carbodiimide groups (—N=C=N— structure) per molecule. Examples include aliphatic polycarbodiimide, alicyclic polycarbodiimide, aromatic polycarbodiimide, and copolymers thereof. The polycarbodiimide compound is preferably an aliphatic polycarbodiimide compound or an alicyclic polycarbodiimide compound.

The polycarbodiimide compound is obtained, for example, by decarboxylating a diisocyanate compound. Examples of usable diisocyanate compounds include 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, 1,5-naphthylene diisocyanate, hexamethylene diisocyanate, dicyclohexylmethane diisocyanate, cyclohexane-1,4-diisocyanate, xylylene diisocyanate, isophorone diisocyanate, methylcyclohexane diisocyanate, tetramethylxylylene diisocyanate, and 1,3,5-triisopropyl phenylene-2,4-diisocyanate. These compounds may be used singly, or two or more compounds may be copolymerized for use. Additionally, a branched structure may be introduced to these compounds, or functional groups other than carbodiimide groups and isocyanate groups may be introduced by copolymerization. Although the isocyanate at each terminal can be used as is, the isocyanate may also be allowed to react, in order to control the degree of polymerization, or part of the terminal isocyanate may be blocked.

In particular, the polycarbodiimide compound is preferably alicyclic polycarbodiimide derived from dicyclohexylmethane diisocyanate, cyclohexane-1,4-diisocyanate, or isophorone diisocyanate, and particularly preferably polycarbodiimide derived from dicyclohexylmethane diisocyanate or isophorone diisocyanate.

The polycarbodiimide compound preferably has 2 to 50 carbodiimide groups per molecule from the standpoint of stability and easy handling. The polycarbodiimide compound more preferably has 5 to 30 carbodiimide groups per molecule. The number of carbodiimides in one molecule of a polycarbodiimide (i.e., the number of carbodiimide groups) corresponds to the degree of polymerization when the polycarbodiimide is obtained from a diisocyanate compound. For example, the degree of polymerization of a polycarbodiimide obtained by linearly linking 21 diisocyanate compounds is 20, and the number of carbodiimide groups in the molecular chain is 20. Typically, a polycarbodiimide compound is a mixture of molecules of different lengths, and the number of carbodiimide groups is expressed by an average value. Because a polycarbodiimide compound that has carbodiimide groups within the numerical range described above and that is a solid at about room temperature can be formed into a powder, the compound is excellent in workability and compatibility when mixed with the thermoplastic polyester elastomer (A), and is also preferable in terms of uniform reactivity and bleedout resistance. The number of carbodiimide groups can be measured, for example, by a standard method (a method in which a compound is dissolved in an amine, and subjected to back titration with hydrochloric acid).

The polycarbodiimide compound has an isocyanate group at each terminal, and the isocyanate group content is preferably 0.5 to 4 mass % from the standpoint of stability and easy handling. The isocyanate group content is more preferably 1 to 3 mass %, In particular, polycarbodiimides derived from dicyclohexylmethane diisocyanate or isophorone diisocyanate with the isocyanate group content within the range described above are preferable. The isocyanate group content can be measured by a standard method (a method in which a compound is dissolved in an amine and subjected to back titration, with hydrochloric acid).

When the thickening agent (B) is a compound having isocyanate groups, the compound includes polycarbodiimide compounds having isocyanate groups as described above and isocyanate compounds that serve as a starting material for the polycarbodiimide compounds.

When the thickening agent (B) is a compound having acid anhydride groups, the compound preferably contains 2 to 4 anhydrides per molecule from the standpoint of stability and easy handling. Examples of this compound include phthalic anhydride, trimellitic anhydride, and pyromellitic anhydride.

The thickening agent (B) is present in an amount of 0 to 5 parts by mass, preferably 0.1 parts by mass or more and 4 parts by mass or less, and more preferably 0.3 parts by mass or more and 3 parts by mass or less, per 100 parts by mass of the thermoplastic polyester elastomer (A).

As described later, the polyester elastomer resin composition of the present invention preferably has a reduced viscosity of 2.0 dl/g or more. Thus, if the reduced viscosity is 2.0 dl/g or more without the thickening agent (B), the amount of the thickening agent (B) may be zero.

When the thickening agent (B) is contained, less than 0.1 parts by mass of the agent (B) may result in a failure to sufficiently achieve the target molecular chain extension effect, while more than 5 parts by mass leads to an overly thickening effect, which may adversely affect the moldability or the mechanical characteristics of the resulting molded article. When the thickening agent (B) is an epoxy compound, more than 5 parts by mass may result in an uneven surface of the resulting molded article due to the aggregation and curing of the epoxy compound. When the thickening agent (B) is a carbodiimide compound, more than 5 parts by mass is likely to affect the mechanical characteristics because the basicity of the polycarbodiimide compound causes hydrolysis of the thermoplastic polyester elastomer (A).

The polyester elastomer resin composition of the Present invention preferably has a reduced viscosity of 2.0 to 3.5 dl/g, more preferably 2.1 to 3.0 dl/g, and still more preferably 2.2 to 2.9 dl/g. A reduced viscosity of less than 2.0 dl/g may lead to insufficient heat aging resistance of the resin composition, which is likely to result in a failure to achieve the target grease resistance. A reduced viscosity of more than 3.5 dl/g may deteriorate the molding processability, in particular in injection molding, increasing the likelihood of causing surface defects on the resulting molded article, such as flow marks.

The polyester elastomer resin composition of the present invention preferably has an acid value of 0 to 5 eq/t. An acid value of more than 5 eq/t is likely to significantly decrease the mechanical characteristics at a high temperature of 130° C. or more because of the hydrolysis caused by the action of the urea compound in grease.

To achieve a solution viscosity and an acid value of the polyester elastomer resin composition within the ranges described above, the method using the thickening agent described above is simple and convenient. However, there is no limitation to this method, and for example, solid-state polymerization may be used. For solid-state polymerization, a known method may be used. Examples of such a method include a method in which pellets are allowed to undergo polycondensation, while being allowed to stand or being in motion, at a temperature lower than the melting point of the thermoplastic polyester elastomer by 20 to 40° C. in an inert gas stream or under reduced pressure, to achieve a high viscosity.

Urea Compound Scavenger (C)

The urea compound scavenger (C) for use in the present invention is not limited, as longus the scavenger, due to being present in the polyester elastomer resin composition, can capture or dissolve the urea compound contained in grease to prevent the urea compound from intruding into the thermoplastic polyester elastomer (A), thus weakening the action of the urea compound on the skeleton molecule of the thermoplastic polyester elastomer (A), and reducing degradation of the thermoplastic polyester elastomer (A). To weaken the action of the urea compound on the thermoplastic polyester elastomer (A), the urea compound scavenger must have an amine value of 50 eq/t or more. The urea compound scavenger preferably has an amine value of 70 eq/t or more, and more preferably 100 eq/t or more.

The urea compound scavenger (C) for use in the present invention is preferably an amino group-containing compound, and may be an aliphatic, or aromatic low-molecular-weight amino group-containing compound or an aliphatic or aromatic high-molecular-weight amino group-containing compound. The amino group-containing compound may also be a synthetic substance or a biological substance (a natural substance).

Examples of low-molecular-weight compounds of the amino group-containing compound for use in the present invention include 1,8-diaminonaphthalate, 3,4-diaminobenzoic acid, 2-aminobenzamide, biuret, malonamide, salicylamide, salicylanilide, o-phenylenediamine, o-mercaptobenzamide, N-acetylglycinamide, 3-mercapto-1,2-propanediol, and 4-amino-3-hydroxybenzoic acid. Examples of high-molecular-weight compounds of the amino group-containing compound include amino-terminated polyamides, amino-terminated polyethers, amino-terminated polyesters, amino-terminated polyurethanes, amino-terminated polyureas, amino group-containing acrylic resins, amino group-modified olefin resins, and amino group-containing organopolysiloxanes.

The urea compound scavenger (C) for use is preferably a high-molecular-weight amino group-containing compound; in that case, the urea compound scavenger (C) preferably has an amine value of 50 to 2000 eq/t.

The amino group-containing compound for use in the present invention is preferably a polyamide having an amine value of 50 to 2000 eq/t.

The following describes the case where the urea compound scavenger contained in the resin composition of the present invention is a polyamide resin.

Polyamide Resin

A polyamide resin as used in the present invention refers to a high-molecular-weight compound having amide linkages in the molecular chain, and includes polyamides obtained from a diamine and a dicarboxylic acid, the diamine having $C_{2-20}$ aliphatic hydrocarbon groups or substituted aliphatic hydrocarbon groups, or $C_{6-16}$ aromatic hydrocarbon groups or substituted $C_{6-16}$ aromatic hydrocarbon groups, and the dicarboxylic acid having $C_{2-20}$ aliphatic hydrocarbon groups or substituted $C_{2-20}$ aliphatic hydrocarbon groups, or $C_{6-16}$ aromatic hydrocarbon groups or substituted $C_{6-16}$ aromatic hydrocarbon groups; polymers obtained from lactams; and polymers obtained from ω-amino carboxylic acid. Examples include polymers of a salt obtained by a reaction of an acid, such as adipic acid, sebacic acid, linoleic acid, and dodecanedioic acid, with ethylene diamine, hexamethylene diamine, meta-xylylene diamine, or the like. Any of these copolymers or a combination of two or more may be used. Specific examples include those obtained from a lactam or ω-amino carboxylic acid, such as polyamide 4, polyamide 6, polyamide 7, polyamide 8, polyamide 9, polyamide 11, and polyamide 12; those obtained from a diamine and a dicarboxylic acid, such as polyamide 66, polyamide 69, polyamide 610, polyamide 611, polyamide 612, polyamide 6T, polyamide 6I, and polyamide MXD6; and copolymers of those listed above, such as polyamide 6/66, polyamide 6/610, polyamide 6/GT, polyamide 6I/6T, polyamide 6/66/610, and Polyamide 6/66/12.

The content ratio of the thermoplastic polyester elastomer to the urea compound scavenger (C) in the resin composition of the present invention ((A)/(C)) is 100/0.1 to 100/10 on a mass ratio basis. More than 10 parts by mass of the urea compound scavenger (C) may impair the inherent properties of the thermoplastic polyester elastomer (A), and less than 0.1 parts by mass of the urea compound scavenger (C) may not exhibit its urea compound-scavenging effect. The urea compound scavenger (C) is preferably present in an amount of 1 to 8 parts by mass, and more preferably 2 to 5 parts by mass, per 100 parts by mass of the thermoplastic polyester elastomer (A).

The urea compound scavenger (C) must have an amine value of 50 eq/t or more. The urea compound scavenger (C) having an amine value of less than 50 eq/t may have less effect in weakening the action of the urea compound on the thermoplastic polyester elastomer W. When the amine value is more than 2000 eq/t, the thermoplastic polyester elastomer (A) may hydrolyze, affecting the mechanical characteristics.

When the urea compound scavenger (C) is a polyamide, the urea compound scavenger (C) is preferably present in an amount of 10 parts by mass or less, more preferably 5 parts by mass or less, and particularly preferably 3 parts by mass or less, per 100 parts by mass of the thermoplastic polyester elastomer (A), and the urea compound scavenger (C) preferably has an amine value of 70 to 1000 eq/t, and more preferably 100 to 700 eq/t.

The resin composition of the present invention preferably contains a widely used antioxidant, such as an aromatic amine-based antioxidant, a hindered phenol-based antioxidant, a phosphorus-based antioxidant, and a sulfur-based antioxidant. These antioxidants may be used in a combination of two or more.

Specific examples of the aromatic amine-based antioxidant for use in the resin composition of the present invention include phenyl naphthylamine, 4,4'-dimethoxy diphenylamine, 4,4'-bis(α,α-dimethylbenzyl) diphenylamine, and 4-isopropoxy diphenylamine.

For the hindered phenol-based antioxidant, a widely used compound can be used. Compounds having a molecular weight of 500 or more, such as N,N'-hexamethylene-bis(3,5-di-t-butyl-4-hydroxyhydrocinnamamide) and tetrakis[methylene-3(3,5-di-t-butyl-4-hydroxyphenyl)propionate]methane, are preferable because they are unlikely to volatilize in a high-temperature atmosphere.

Examples of the phosphorus-based antioxidant include compounds containing phosphorus, such as phosphoric acid, phosphorous acid, hypophosphorous acid derivatives, phenylphosphonic acid, polyphosphonate, and diphosphite-based compounds. Specific examples include triphenyl phosphite, diphenyldecyl phosphite, phenyl diisodecyl phosphite, tri(nonylphenyl) phosphite, bis(2,4-di-t-butylphenyl) pentaerythritol diphosphite, and bis(2,6-di-t-butyl-4-methylphenyl)pentaerythritol diphosphite.

Examples of the sulfur-based antioxidant include compounds containing sulfur, such as thioether-based compounds, dithioic acid salt-based compounds, mercapto benzimidazole-based compounds, thiocarbanilide-based compounds, and thiodipropionic ester-based compounds. Specific examples include dilauryl thiodipropionate, distearyl thiodipropionate, didodecyl thiodipropionate, ditetradecyl thiodipropionate, dioctadecyl thiodipropionate, pentaerythritol tetrakis(3-dodecyl thiopropionate), thiobis(N-phenyl-β-naphthylamine), mercaptobenzothiazole, 2-mercaptobenzimidazole, tetramethylthiuram monosulfide, tetramethylthiuram disulfide, nickel dibutyl dithiocarbamate, nickel isopropyl xanthate, and trilauryl trithiophosphite. In particular, thioether-based antioxidants having a thioether structure are suitably used, because thioether-based antioxidants receive oxygen from an oxidized substance to reduce the substance.

Any of these antioxidants is preferably present in an amount of 0.01 to 3 parts by mass, more preferably 0.05 to 2 parts by mass, and still more preferably 0.1 to 1 parts by mass, per 100 parts by mass of the thermoplastic polyester elastomer (A).

A method for determining the formulation of the polyester elastomer resin composition for use in the present invention and the component ratio may be the following: the formulation and the component ratio are calculated from the proton integration ratio of $^1$H-NMR, which is measured by dissolving a sample in a solvent, such as deuterated chloroform.

Additionally, when the resin composition of the present invention is required to have weatherability, it is preferable to add an ultraviolet absorber and/or a hindered amine-based compound. For example, usable light stabilizers include benzophenone-based stabilizers, benzotriazole-based stabilizers, triazole-based stabilizers, nickel-based stabilizers, and salicyl-based stabilizers. The amount of a light stabilizer is preferably 0.1% or more and 5% or less based on the polyester elastomer resin composition on a mass basis.

The polyester elastomer resin composition of the present invention may contain various other additives. Additives, such as resins other than those described above, inorganic fillers, stabilizers, and anti-aging agents, may be added in such an amount as to not impair the features of the present invention. Other additives, such as color pigments, inorganic or organic-based bulking agents, coupling agents, tackiness improvers, quenchers, stabilizers, such as metal deactivators, and flame retardants, may also be added. These additives are preferably present in a total amount of 20 parts by mass or less, and more preferably 10 parts by mass or less, per 100 parts by mass of the thermoplastic polyester elastomer (A).

The thermoplastic polyester elastomer (A), the thickening agent (B), and the urea compound scavenger (C) are preferably present in a total amount of 70 mass % or more, more preferably 80 mass % or more, and still more preferably 90 mass % or more in the polyester elastomer resin composition of the present invention.

The polyester elastomer resin composition of the present invention has the following feature: in a heat aging test for evaluating grease resistance described in Examples below, the tensile elongation is 200% or more after the polyester elastomer resin composition is subjected to a heat treatment at 140° C. for 300 hours. The tensile elongation refers to an elongation at break as measured in accordance with JIS K6251:2010, as described in the Examples.

The polyester elastomer resin composition of the present invention has the following feature: in a flexing fatigue test for evaluating grease resistance described in Examples below, the De Mattia break number in the atmosphere at 130° C. (the repeated number until the resin composition is broken) is 4 million times or more.

EXAMPLES

The following describes Examples to explain the present invention in more detail. However, the present invention is not limited to the Examples in any manner. The measurement values described in the Examples were measured in accordance with the following methods.

Melting Point:

A DSC220 differential scanning calorimeter produced by Seiko Instruments Inc. was used. 5 mg of a measurement sample was placed in an aluminum pan, and the pan was hermetically sealed with a pressed lid. The sample was molten at 250° C. for 2 minutes in nitrogen, and the temperature was decreased to 50° C. at a temperature decrease rate of 20° C./min, and then the temperature was increased from 50° to 250° C. at a rate of 20° C./min. The endothermic peak due to melting in the obtained thermogram curve was determined to be the melting point.

Reduced Viscosity (dl/g):

0.02 g of a well dried polyester elastomer resin composition was dissolved in 10 mL of a mixture solvent of phenol/tetrachloroethane (mass ratio: 6/4), and measured at 30° C. with an Ubbelohde viscometer.

Acid Value (eq/ton):

0.2 g of a sample was precisely weighed, dissolved in 20 mL of chloroform, and titrated with 0.01N potassium hydroxide (an ethanol solution) for determining the acid value. Phenolphthalein was used for the indicator.

Amine Value (eq/ton):

3 g of a sample was weighed and dissolved in 80 mL of m-cresol. The solution was titrated with 0.05 mol/L, of a solution of perchloric acid in methanol as a volumetric solution using AT-500N produced by Kyoto Electronics Manufacturing Co., Ltd. in accordance with the potentiometric titration technique to determine the amine value.

Starting materials used in the Examples are as follows.

Thermoplastic Polyester Elastomer (A):

Polyester Elastomer A1

In accordance with the method disclosed in Reference Example 1 of JPH09-59491A (paragraph [0017]), a thermoplastic polyester elastomer was prepared from terephthalic acid/1,4-butanediol/polyoxy tetramethylene glycol (PTMG: the number average molecular weight 1500) at a molar ratio of 100/88/12. This polyester elastomer A1 had a melting point of 197° C., a reduced viscosity of 1.86 dl/g, and an acid value of 38 eq/t.

Polyester Elastomer A2

In accordance with the method disclosed in Reference Example 1 of JPH09-59491A (paragraph [0017]), a thermoplastic polyester elastomer was Prepared from terephthalic acid/1,4-butanediol/polyoxy tetramethylene glycol (PTMG: the number average molecular weight 2000) at a molar ratio of 100/90/10.

This polyester elastomer A2 had a melting point of 205° C., a reduced viscosity of 2.15 dl/g, and an acid value of 35 eq/t.

Polyester Elastomer A3

The polyester elastomer A1 was treated in a vacuum at 190° C. for 20 hours.

This polyester elastomer A3 had a melting point of 201° C., a reduced viscosity of 2.86 dl/g, and an acid value of 21 eq/t.

Thickening Agent (B)

Triazine skeleton-containing trifunctional epoxy compound (B1): TEPIC-S (produced by Nissan Chemical Industries, Ltd.)

Alicyclic polycarbodiimide compound (B2) Carbodilite LA-1 (produced by Nisshinbo Holdings Inc.)

Urea Compound Scavenger (C)

Polyamide resin (C1): polyamide 6 (amine value: 26 eq/ton)

Polyamide resin (C2): polyamide 6/66/610 (59/24/17 mol %) (amine value: 25 eq/ton)

Polyamide resin (C3): polyamide MXD6 (amine value: 136 eq/ton)

Polyamide resin (C4): polyamide 6/66/12 (31/21/48 mol %) (amine value: 490 eq/ton)

Examples 1 to 5 and Comparative Examples 1 to 6

The components, each at a ratio shown in Table 1 per 100 parts by mass of the thermoplastic polyester elastomer, were molten and kneaded at 240° C., and formed into pellets with a twin screw extruder. During kneading, the following other additives were added: per 100 parts by mass of the thermoplastic polyester elastomer, 0.2 parts by mass of Licowax B as a mold-releasing agent (produced by Clariant), and 0.8 parts by mass of NONFLEX DCD (produced by Ouchi Shinko Chemical Industrial Co., Ltd.) (4,4'-bis($\alpha,\alpha$-dimethylbenzyl)diphenylamine), 0.2 parts by mass of Irganox1010 (produced by BASF A.G.), and 0.2 parts by mass of Irganox1098 (produced by BASF A.G.) as antioxidants. In Comparative Example 2, 0.2 parts by mass of Rasumitto LG (produced by DKS Co. Ltd.) (dilauryl thiodiprionate), which is an antioxidant, was, further added. The pellets of these polyester elastomer resin compositions were evaluated as described below. Table 1 shows the results.

Grease Resistance Evaluation Test Method

With a urea compound-containing grease (Raremax UBZ: produced by Kyodo Yushi Co., Ltd.) as a thickener, the pellets were evaluated by a flexing fatigue test and a heat aging test.

Flexing Fatigue Test

With a De Mattia Flex-Cracking Tester BE-102 (produced by Tester Sangyo Co., Ltd.), the following predetermined test specimen was subjected to repeated flexing in which the distance between the chucks was changed between 75 mm and 19 mm at a rate of 300 times/min in the atmosphere at 130° C., and evaluated for flexing fatigue resistance based on the repeated number until the specimen was broken. The test specimen for use was an injection-molded product (width: 20 mm, length: 100 mm, and thickness: 3.6 mm; a groove portion of R2.4 was formed across the entire 20-mm width in the central part in the longitudinal direction) prepared at a cylinder temperature of 240° C. and a mold temperature of 50° C.

To confirm the grease resistance, the test was performed with the test specimen homogeneously coated with 3 g of grease on the reverse side of the groove portion of R2.4.

Heat Aging Test

An injection-molded article prepared at a cylinder temperature of 240° C. and a mold temperature of 50° C. (width: 100 mm, length: 100 mm, and thickness: 2.0 mm) was cut out in a dumbbell shape (JIS No. 3) in the direction perpendicular to the flow direction of the resin of the injection-molded article, thereby preparing a test specimen. With the test specimen homogeneously coated with 3 g of grease on one entire surface thereof, the specimen was annealed with a hot-air dryer at 140° C. for 300 hours. Thereafter, the specimen was measured for tensile elongation (elongation at break) in accordance with JIS K6251: 2010.

TABLE 1

| | | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|
| Formulation (Parts by Mass) | Polyester Elastomer A1 | 100 | 100 | 100 | | | 100 | | | 100 | | 100 |
| | Polyester Elastomer A2 | | | | 100 | | | | 100 | | | |
| | Polyester Elastomer A3 | | | | | 100 | | 100 | | | 100 | |
| | B1(TEPIC-S) | 0.5 | | 0.5 | | | | | | 0.5 | 0.5 | |
| | B2(LA-1) | | 2 | | 2 | | | | | | | |
| | C1 (Amine Value 26) | | | | | | | | | 3 | | |
| | C2 (Amine Value 25) | 3 | 3 | | | 3 | | | | | 3 | |
| | C3 (Amine Value 136) | | | | | | | | | | | |
| | C4 (Amine Value 490) | | | 1.5 | 1.5 | | | | | | | 15 |
| Properties | Reduced Viscosity (dl/g) | 2.85 | 2.30 | 2.90 | 2.55 | 2.70 | 1.80 | 2.65 | 3.02 | 2.88 | 2.60 | 1.55 |
| | Acid Value (eq/t) | 4 | 0 | 4 | 0 | 21 | 35 | 25 | 4 | 4 | 26 | 45 |
| | Grease Resistance | | | | | | | | | | | |
| | Flexing Fatigue Test (times ten thousand) | 550 | 400 | 500 | 550 | 400 | 200 | 350 | 300 | 350 | 350 | 150 |
| | Heat Aging Test (%) | 200 | 280 | 250 | 320 | 220 | 40 | 80 | 90 | 90 | 120 | 40 |

INDUSTRIAL APPLICABILITY

The polyester elastomer resin composition of the present invention exhibits excellent grease resistance at high temperatures, and the polyester elastomer resin composition of the present invention, when being subjected to blow molding or injection molding, provides a molded article usable even in a severe environment as at a temperature exceeding 140° C., in applications involving contact with a urea compound-containing grease.

The invention claimed is:

1. A polyester elastomer resin composition comprising:
a thermoplastic polyester elastomer (A);
a thickening agent (B); and
a urea compound scavenger (C), wherein
the thermoplastic polyester elastomer (A) is composed of a hard segment and a soft segment that are linked to each other,
the hard segment being composed of a polyester formed from an aromatic dicarboxylic acid and an aliphatic and/or alicyclic diol,
the soft segment being at least one member selected from aliphatic polyethers, aliphatic polyesters, or aliphatic polycarbonates,
the urea compound scavenger (C) has an amine value of 70 eq/t or more,
the thickening agent (B) is present in an amount of 0 to 5 parts by mass, and the urea compound scavenger (C) is present in an amount of 0.1 to 10 parts by mass, per 100 parts by mass of the thermoplastic polyester elastomer (A).

2. The polyester elastomer resin composition according to claim 1, wherein the urea compound scavenger (C) is an amino group-containing compound having an amine value of 70 to 2000 eq/t.

3. The polyester elastomer resin composition according to claim 1, which has a reduced viscosity of 2.0 to 3.5 dl/g, and an acid value of 0 to 5 eq/t.

4. The polyester elastomer resin composition according to claim 1, wherein the thickening agent (B) is a polyfunctional compound having at least one reactive group selected from epoxy groups, acid anhydride groups, carbodiimide groups, or isocyanate groups.

5. The polyester elastomer resin composition according to claim 1, wherein the urea compound scavenger (C) is a polyamide.

6. The polyester elastomer resin composition according to claim 1, wherein after the polyester elastomer resin composition is subjected to heat treatment at 140° C. for 300 hours with a urea compound-containing grease being applied to the composition, the polyester elastomer resin composition has a tensile elongation of 200% or more.

7. The polyester elastomer resin composition according to claim 1, wherein the soft segment of the thermoplastic polyester elastomer resin (A) is an aliphatic polyether.

* * * * *